(12) United States Patent
Thevenod et al.

(10) Patent No.: US 6,435,729 B1
(45) Date of Patent: Aug. 20, 2002

(54) COUPLING DEVICE, PARTICULARLY FOR A FIBRE-OPTIC NETWORK

(75) Inventors: Serge Thevenod, Marcellaz; Yvan Bellemon; René Chaffard, both of Reignier, all of (FR)

(73) Assignee: Societe de Fabrication Industrielle et Mecanique - SOFIM (FR)

( * ) Notice: Subject to any disclaimer, the term of this patent is extended or adjusted under 35 U.S.C. 154(b) by 0 days.

(21) Appl. No.: 09/155,810
(22) PCT Filed: Mar. 27, 1997
(86) PCT No.: PCT/FR97/00558
§ 371 (c)(1), (2), (4) Date: Jun. 17, 1999
(87) PCT Pub. No.: WO97/37413
PCT Pub. Date: Oct. 9, 1997

(30) Foreign Application Priority Data

Mar. 29, 1996 (FR) .............................. 96 03960

(51) Int. Cl.[7] ................................................ G02B 6/36
(52) U.S. Cl. ............................ 385/76; 385/53; 385/55; 385/134; 385/135; 439/131
(58) Field of Search ................ 385/76, 77, 78, 385/53, 55, 57, 134–137; 174/48, 49, 53; 439/131

(56) References Cited

U.S. PATENT DOCUMENTS

| 4,950,839 A | | 8/1990 | Quinn et al. |
| 4,960,317 A | * | 10/1990 | Briggs et al. ................. 385/56 |
| 5,076,429 A | | 12/1991 | Patrick et al. |
| 5,122,069 A | | 6/1992 | Brownlie et al. |
| 5,317,485 A | * | 5/1994 | Merjanian .................... 362/574 |
| 5,363,467 A | * | 11/1994 | Keith .......................... 385/135 |
| 5,473,717 A | | 12/1995 | Baptiste et al. |
| 5,687,268 A | * | 11/1997 | Stephenson et al. .......... 385/73 |
| 5,949,946 A | * | 9/1999 | Debortoli et al. ........... 385/134 |

FOREIGN PATENT DOCUMENTS

| EP | 0491083 A1 | 6/1992 |
| FR | 2 713 307 A1 | 6/1995 |
| WO | WO 93 11049 | 6/1993 |

* cited by examiner

Primary Examiner—Hemang Sanghavi
(74) Attorney, Agent, or Firm—Blakely Sokoloff Taylor & Zafman LLP

(57) ABSTRACT

A coupling device, in particular for an optical fiber network, the device being of the type comprising a housing (100) and a shutter (200) pivoted to the housing (100) in register with the outline of an opening (112) therein, the device being characterized by the fact that the shutter (200) comprises a cylindrical dome (210) centered on the pivot axis, and by the fact that the pivot axis is set back from the front face (114) defining the opening of the housing (100).

15 Claims, 5 Drawing Sheets

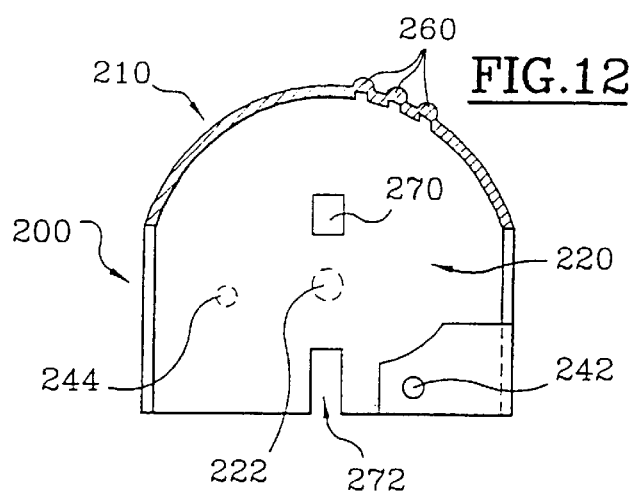
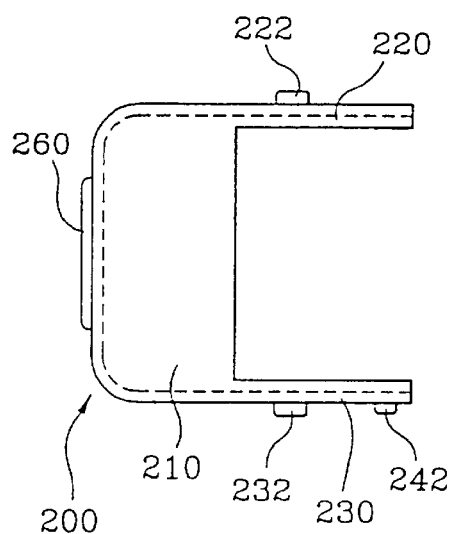
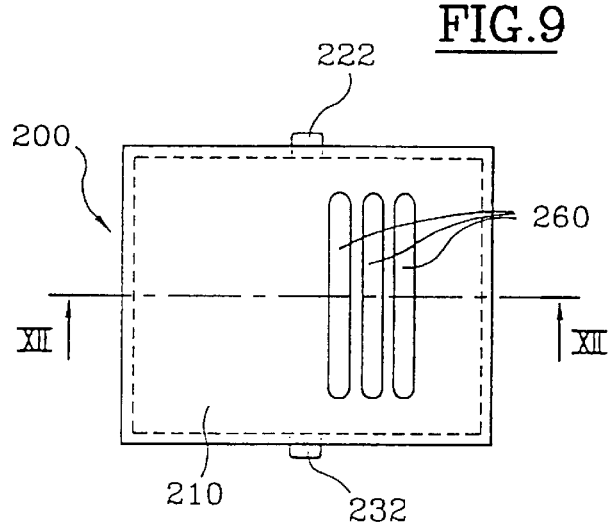
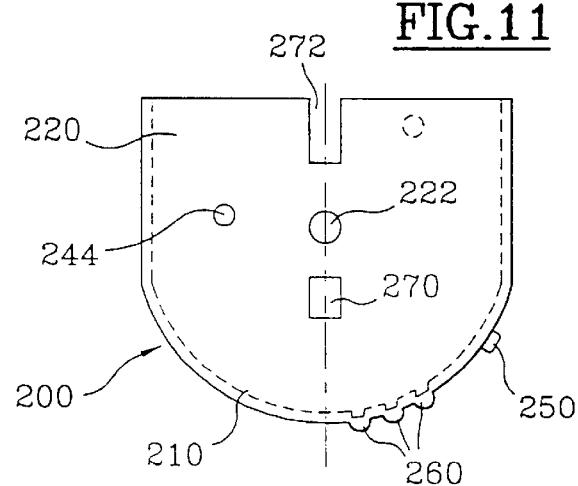

COUPLING DEVICE, PARTICULARLY FOR A FIBRE-OPTIC NETWORK

BACKGROUND OF THE INVENTION

1. Field of the Invention

The present invention relates to the field of devices for coupling together appropriately-fitted hardware in a local network, in particular by means of optical fibers.

2. Description of the Prior Art

Optical fibers have long been restricted to long and medium distance communications at high data rates. Nevertheless, optical fibers are now seen to be moving progressively into the local networks of businesses. Optical fibers are progressively reaching the access points of subscriber terminals, i.e. they are directly serving workstations fitted with electro-optical interface cards.

Although mainly used for computer purposes (local networks), the coupling device of the present invention can nevertheless also be used for other optical connections, for example in the context of multimedia applications.

Various types of coupling have already been proposed, in particular for optical fiber networks.

In particular, projecting optical sockets have been proposed that are placed in skirting boards or in mounting boxes sunk into walls. Such a socket is sometimes protected by a shutter, and under such circumstances it is considered as being dust-proof under certain structural conditions.

Proposals have recently been made for a retractable socket of the type shown diagrammatically in accompanying FIGS. 1 and 2 where the socket is shown respectively in the closed position and in the open position, with the principle thereof consisting in hiding the mechanism that receives the optical connection inside the skirting board. In FIGS. 1 and 2, there can be seen a coupling device comprising a housing 10 that can be received inside a skirting board, a shutter 20 that is hinged to pivot on the housing 10 about an axis 20 that coincides with the front face 12 of the housing 10, and a support 30 associated with the shutter 20 and carrying connectors 40. To access the connectors 40 for coupling purposes, the device is opened by pivoting the shutter 20, as shown in FIG. 2. That known device has the advantage of occupying minimum space when the socket is not in use. Nevertheless, such a device suffers from a major drawback: in the open position which is required throughout use in the coupled position, it occupies a relatively large amount of space (see FIG. 2).

SUMMARY OF THE INVENTION

An object of the present invention is to propose a coupling device that occupies a minimum amount of space, both at rest and when in use in the coupled position. Another object is to provide dust-proofing around the connectors.

According to the present invention, these objects are achieved by a device of the type comprising a housing and a shutter pivoted to the housing in register with the outline of an opening therein, characterized by the fact that the shutter comprises a cylindrical dome centered on the pivot axis, and by the fact that the pivot axis is set back from the front face defining the opening of the housing.

According to another advantageous characteristic of the present invention, the pivot axis of the shutter is situated at a distance from the front face of the housing that is substantially equal to the radius of the cylindrical dome.

Other characteristics, objects, and advantages of the present invention appear on reading the following detailed description with reference to the accompanying drawings given by way of non-limiting example, and in which:

BRIEF DESCRIPTION OF THE DRAWINGS

FIGS. 9, 10, 11, and 12 show a variant embodiment of a shutter of the invention, FIG. 9 being a view of the front face of the shutter, while FIGS. 10 and 11 are two orthogonal side views, and FIG. 12 is a section view on section plane XII—XII of FIG. 9;

DETAILED DESCRIPTION OF THE INVENTION

Figure 1:
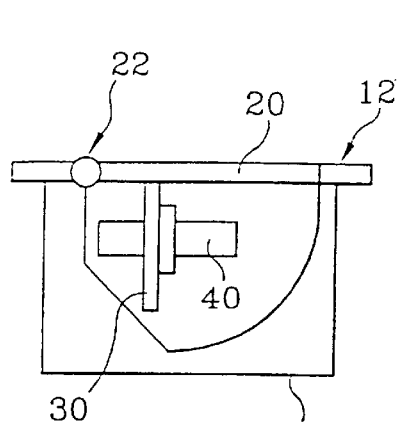
FIGS. 1 and 2, described above, are diagrams showing a coupling device in the state of the art, respectively in the closed position and in the open position.
Figure 2:
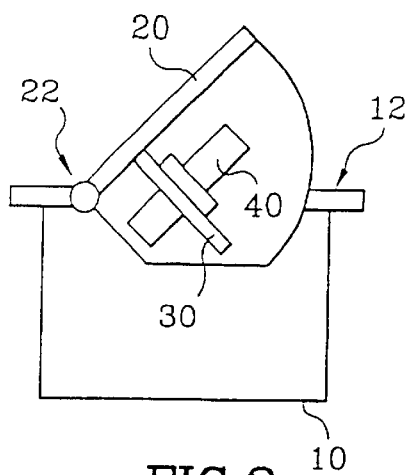

The coupling device of the present invention shown in the accompanying figures essentially comprises a support block or housing 100, a shutter or tilting body 200, and a support 300 receiving connectors 400. Where appropriate, the device may also have a covering finger plate 500.

The support block or housing 100 comprises a frame 110 and two side plates 120 and 130. The frame 110 is preferably rectangular. It defines the outline of an opening 112 that is also rectangular and it corresponds to the front face 114 of the housing. The two side plates 120 and 130 are parallel to each other and orthogonal to the frame 110. They project from the long sides 115 and 116 of the frame 110.

Each of the two side plates 120 and 130 has a respective bore 122, 132 passing through the thickness thereof. The two bores 122 and 132 lie on the same axis O.

The centers of the bores 122 and 132 are situated at a distance from the front face 114 that is substantially equal to the radius of a cylindrical dome 210 belonging to the shutter 200.

The bores 122 and 132 are designed to receive complementary stub axles 222 and 232 projecting on a common axis from the shutter 200.

Figure 3:
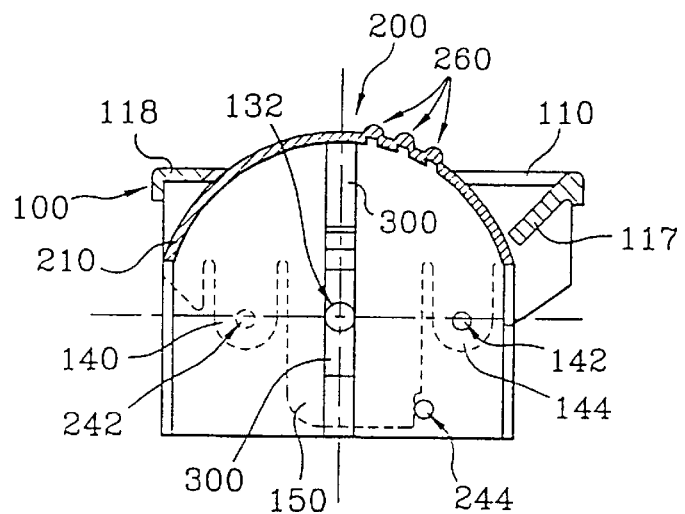
FIGS. 3 and 4 are two similar section views through a coupling device of the present invention respectively in the closed position and in the open position.
Figure 4:
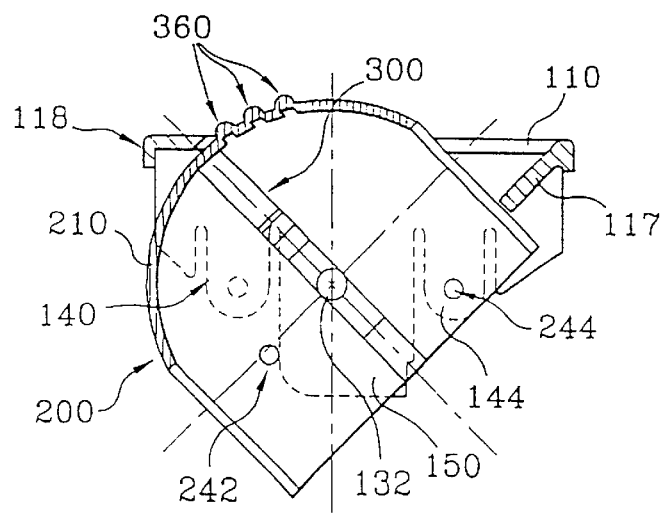
Figure 7:
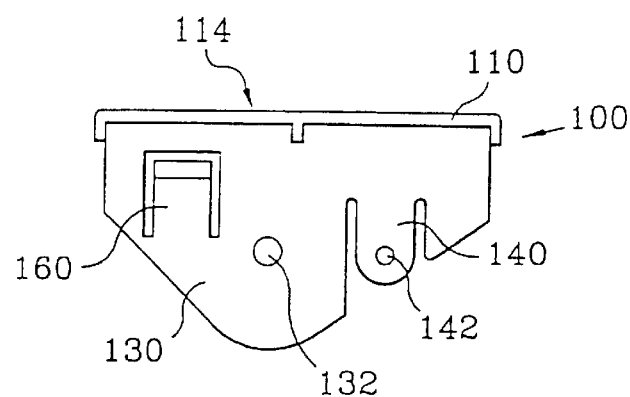
FIGS. 5, 6, 7, and 8 show a variant embodiment of a housing of the invention, FIG. 5 being a front face view, FIGS. 6 and 7 being two orthogonal side views, and FIG. 8 being a section view of the housing on section plane VIII—VIII of FIG. 5.
Figure 6:
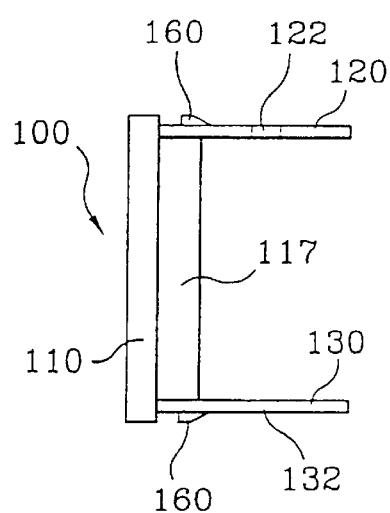
Figure 5:
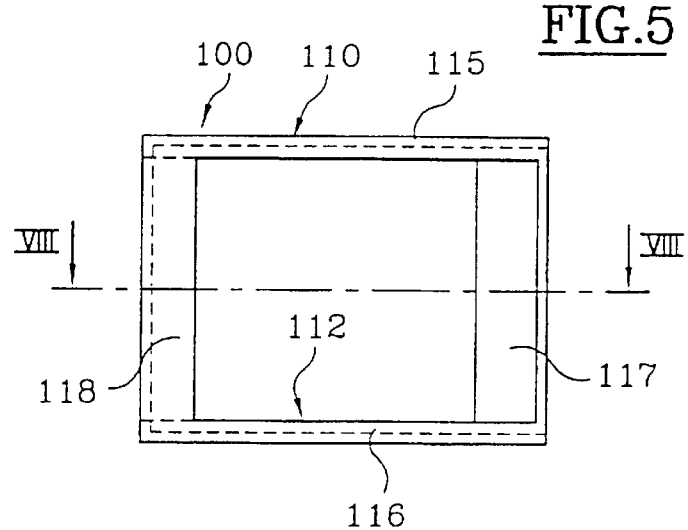

The side plates 120 and 130 have means for indexing the shutter 200 between a closed position as shown in FIG. 3 and an open position as shown in FIG. 4. These indexing means are designed to ensure that the shutter 200 holds itself relative to the housing 100 in each of said open and closed positions while nevertheless allowing the shutter 200 to move between those two positions when urged appropriately.

By way of non-limiting example, the indexing means are formed by at least one resilient tab 140 provided with a recess or a through bore 142 designed to receive at least one complementary stud 242.

The resilient tab 140 is preferably secured to the housing 100 while the stud 242 is secured to the pivoting shutter 200. Nevertheless, the opposite configuration could also be used. Thus, the resilient tab may be provided on the pivoting shutter while the complementary indexing stud is provided on the housing 100.

More precisely, as shown in FIGS. 3 and 4, two resilient tabs 140 and 144 can be provided on a single side plate of the housing 100 to co-operate with respective studs 242 and 244 provided on the pivoting shutter 200 depending on whether it is placed in its closed position as shown in FIG. 3 or its open position as shown in FIG. 4.

In another embodiment, shown in FIGS. 5 to 12, a first resilient tab 140 can be provided on one of the side plates 130 to co-operate with a stud 242 provided on a first side plate 230 of the shutter 200, and a second resilient tab 144 can be provided on the second side plate 120 to co-operate with a second stud 244 provided on a second side plate 222 of the shutter 200.

The person skilled in the art will readily understand that the studs 242, 244 penetrate into the recesses or bores 242 in the tabs 140, 144 by the tabs being deformed inelastically.

Means are also provided for limiting the amplitude of pivoting of the shutter 200 relative to the housing 100.

These pivot-limiting means can be embodied in various different ways.

In the first embodiment shown in FIGS. 3 and 4, these pivot-limiting means are constituted by a central beam 150 provided on at least one of the side plates 120, 130 of the housing 100 and serving as abutments for the studs 242, 244 depending on the position occupied by the shutter 200.

In contrast, in the second embodiment shown in FIGS. 2 to 12, the means for limiting pivoting of the shutter 200 relative to the housing 100 are constituted by means provided on the shutter 200 and coming into abutment against at least one of the cross-members 117, 118 of the frame 110.

Still more precisely, in the embodiment shown in FIGS. 5 to 12, these pivot-limiting means are formed, for the closed position, by a peg 250 projecting from the cylindrical dome 210 to bear against the cross-member 117, and for the open position, by ribs 260 projecting from the cylindrical dome 210 and adapted to bear against the cross-member 118, possibly accompanied by the edges of the side plates 220, 230 of the shutter 200 coming to bear against the cross-member 117.

Figure 8:
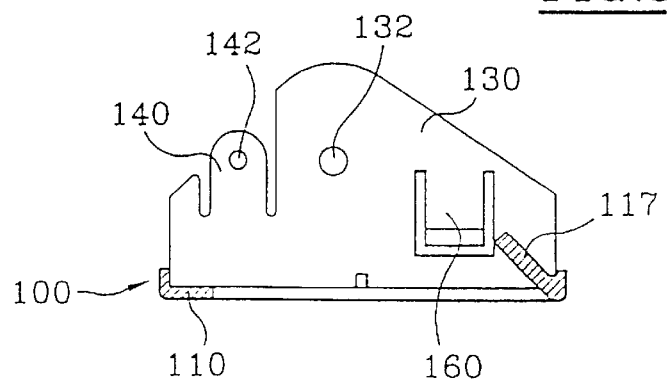

As can be seen particularly in FIGS. 3, 4, and 8, one of the cross-members 117 parallel to the axis of rotation of the shutter 200 is preferably constituted by a sloping plane, e.g. a plane that slopes towards the axis of rotation at 45° relative to the outline of the opening in the housing 100. Such an inclined plane 117 extends parallel to the opening channel of the device and makes it easier to put the connection means into place.

Where appropriate, as shown in FIGS. 5 to 8, at least one of the side plates 120, 130 can be fitted with a resilient tongue having teeth 160 enabling the housing 100 to be held stationary by being snap-fastened in a skirting board or in a complementary finger plate 500.

The shutter or tilting body 200 essentially comprises a cylindrical dome 210 centered on its axis of rotation and two mutually parallel side plates 220, 230 which are perpendicular to the axis of rotation.

The general shape of the tilting body 200 has two planes of symmetry: one parallel to the two side plates 220, 230; and the other containing the axis of rotation. The two same-axis stub axles 222, 232 designed to penetrate into the bores 122, 132 are provided on the outside surfaces of the side plates 220, 230.

In FIGS. 9 to 12, there can be seen the indexing studs 242, 244 that co-operate with the resilient tabs 140, 144, and also the ribs 260 projecting from the cylindrical dome 210.

By way of non-limiting example, the studs 242, 244 that co-operate with the tabs 140, 144 allow the shutter 200 to pivot through an angle of 45° between its closed position and its open position.

As mentioned above, the device also comprises a plate 300 serving as a support for connectors 400. The support plate 300 is plane. It includes means for fixing the connectors 400. The fixing means can be embodied in numerous different ways.

Figure 13:
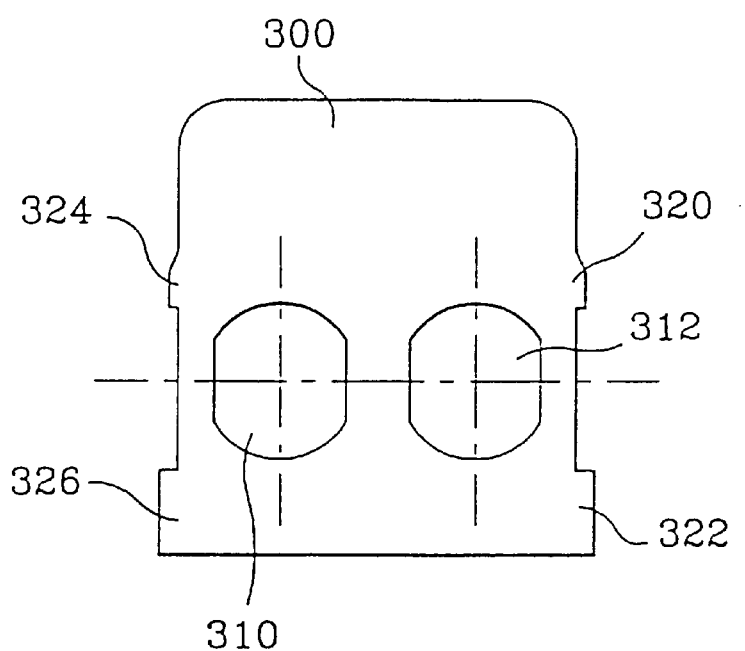
FIGS. 13 and 14 are plan views of two connector supports suitable for use in the context of the invention.
Figure 14:
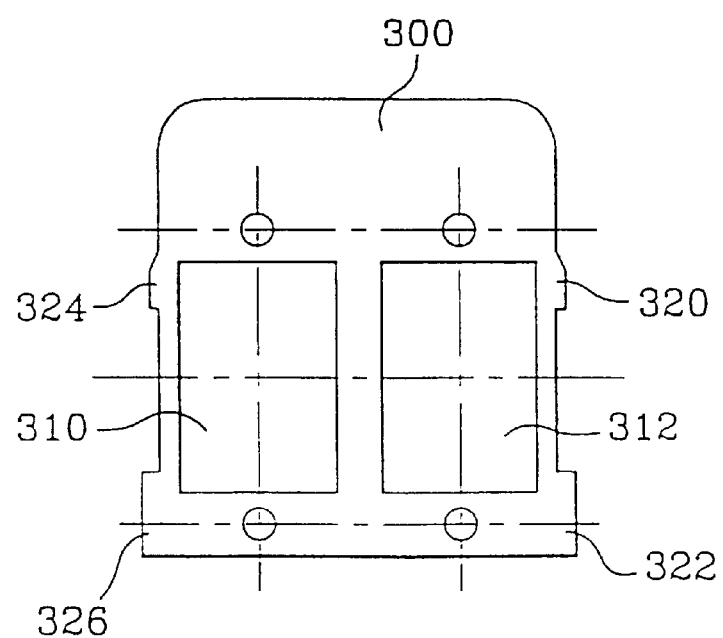

The fixing means are preferably constituted by bores 310, 312. Such bores 310, 312 can be configured in various ways, as shown in FIGS. 13 and 14.

More precisely, these figures show two bores 310, 312. Nevertheless, the invention is not limited to this number of connectors.

The support plate 300 can be molded together with the shutter 200 or it can be applied and fixed to the shutter 200 by any appropriate means.

In the particular embodiment shown in the accompanying figures, the support plate 300 is applied to the shutter 200 and is fixed in the plane of symmetry of the shutter 200 that includes the axis O by means of protuberances 320, 322, 324, 326 provided on the edges of the support plate 300 and designed to engage in complementary indentations 270, 272 formed in the side plates 220, 230.

The connectors 400 are conventional and are not described in detail below. It may be observed that, in use, the axes of the connectors 400 extend perpendicularly to the plane of the support plate 300. The connectors 400 can be fixed to the support 300 by various means such as screws, snap-fastening, etc.

In another variant, the connector support 300 can itself be molded as one or more portions shaped to define the connector assemblies passing therethrough.

The projections 260 provided on the outside surface of the cylindrical dome 210 are preferably formed by rectilinear ribs parallel to the pivot axis. Their function is to make the shutter 200 easier to handle.

The person skilled in the art will readily understand that since the axis of rotation of the shutter 200 is situated at a distance from the front face 114 of the housing 100 that is substantially identical to the radius of the cylindrical dome 210, the volume occupied by the device remains unchanged regardless of the open or closed position of the shutter 200.

It is also shown that when the shutter 200 is in its closed position, it completely covers the outline of the opening 112 in the frame 110. It thus serves to provide part of the dust-proofing around the connectors 400.

Figure 15:
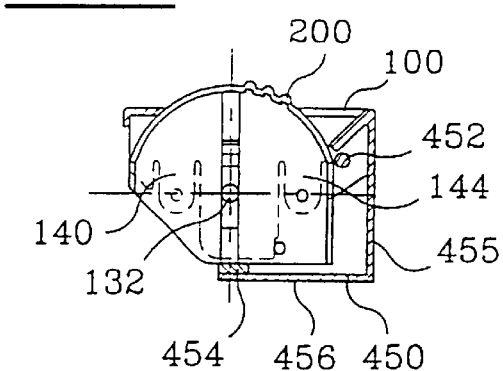
FIGS. 15 and 16 are two views respectively similar to FIGS. 3 and 4 and showing a variant embodiment of the device fitted with sealing gaskets.
Figure 16:
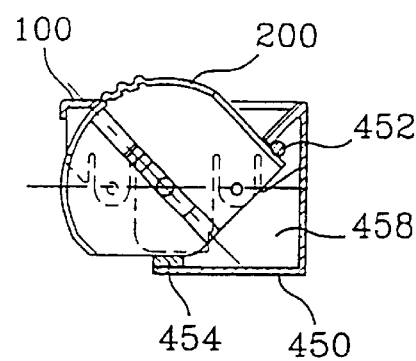

This dust-proofing can be improved by means of a case 450 added to the housing 100, as shown in FIGS. 15 and 16, co-operating with gaskets 452, 454 resting against the pivoting shutter 200.

Still more precisely, in the embodiment shown in FIGS. 15 and 16, the case 450 has side walls 458, a wall 455 orthogonal to the frame 110, and a wall 456 parallel thereto and placed against the bottom of the housing 100.

A first gasket 452 is situated at the base of the sloping plane face 117 of the frame 110. A second gasket 454 is disposed at the end of the wall 456.

To use the coupling device of the present invention, the procedure is essentially as follows.

Firstly, the model of support plate 300 is selected as a function of the desired feedthroughs 400. These feedthroughs are fixed to the chosen connector support 300.

Thereafter the fitted support 300 is inserted into the tilting body 200. For this purpose, the support 300 is placed on the axis of the indentations 270, 272 and is pushed home into the dome 210 until the studs 320, 322, 324, and 326 engage in said indentations by elastic deformation of the side plates 220, 230. Engagement of the projections 320, 322, 324, and 326 in the indentations 270, 272 provides good positioning of the support 300, preventing it from pivoting in the body 200.

The resulting assembly 200, 300 is then inserted into the housing 100. For this purpose, said assembly is inserted between the side plates 120, 130 to position the stub axles 222, 232 in the bores 122, 132 by elastically deforming the side plates 120, 130.

Figure 17:
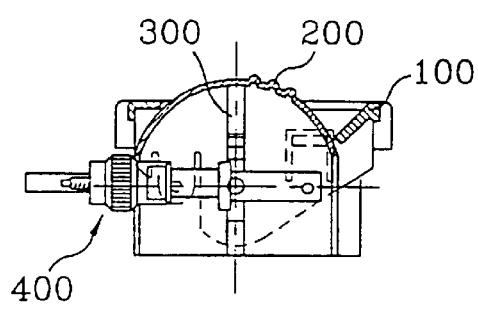
FIGS. 17, 18, and 19 are diagrams showing how the coupling device of the invention is used, FIG. 17 being a section view, similar to FIG. 3, through the device in the closed position, FIG. 18 being a section view, similar to FIG. 4, through the device in the open position and in the coupled state, and FIG. 19 being a view of the front face of the device.

The device can be held with the shutter 200 in the closed position so long as a coupling is not required, e.g. as shown in FIG. 17.

Figure 18:
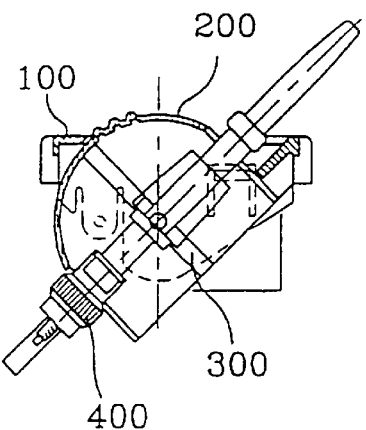
Figure 19:
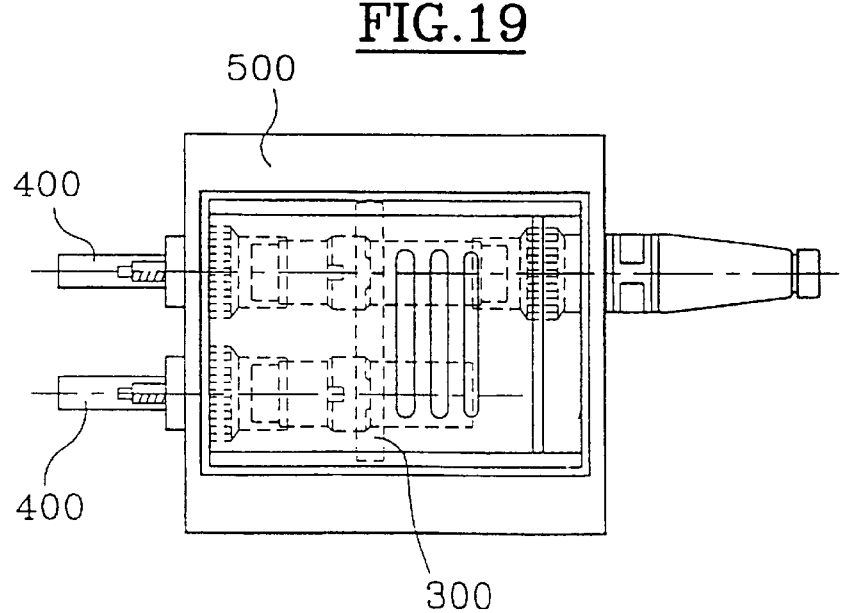

When it is desired to connect a workstation, it suffices to apply finger pressure to cause the assembly constituted by the tilting body 200, the support 300, and the connectors 400 to pivot about the axis of the stub axle 222, 232. The feedthroughs fixed to the body 300 then become accessible and it suffices to connect the appropriate plug(s) of the workstation to the feedthroughs, as shown in FIGS. 18 or 19.

Naturally, the present invention is not limited to the particular embodiments described above, but extends to any variant within the spirit of the invention.

In particular, the invention is not limited to connecting optical fibers as mentioned above, but can also be applied to connecting electrical conductors.

What is claimed is:

1. An apparatus for use in an optical fiber network, comprising:

a housing (100);

and a shutter (200) pivoted to the housing (100) in register with an outline of an opening (112) therein, the shutter (200) comprising a cylindrical dome (210) centered on the pivot axis, and the pivot axis being set back from a front face (114) defining the opening of the housing (100), wherein the pivot axis of the shutter (200) is situated at a distance from the front face (114) of the housing (100) that is substantially equal to the radius of the cylindrical dome (210).

2. A device according to claim 1, characterized by the fact that it further comprises a connector support plate (300) secured to the shutter (200).

3. A device according to claim 2, characterized by the fact that the support plate (300) is integrally molded with the shutter (200).

4. A device according to claim 2, characterized by the fact that the support plate (300) is fitted to and held on the shutter (200).

5. A device according to to claim 1, characterized by the fact that the housing (100) has a frame (110) defining the outline of the opening in the housing and two mutually parallel side plates (120, 130) that are orthogonal to the frame (110).

6. A device according to to claim 1, characterized by the fact that it includes indexing means (140, 144, 242, 244) for indexing the shutter (200) respectively in its closed position and in its open position relative to the housing (100).

7. A device according to claim 6, characterized by the fact that the indexing means are provided on facing side plates (120, 130, 220, 230) of the housing (100) and of the shutter (200).

8. A device according to claim 6, characterized by the fact that the indexing means are formed by at least one resilient tongue (140, 144) provided on one of the housing (100) and the shutter (200), and by at least one complementary stud (242, 244) provided on the other of the shutter (200) and the housing (100).

9. A device according to claim 1, characterized by the fact that the housing (100) further includes at least one resilient tongue (160) adapted to provide snap-fastening to a skirting board or to a finger plate.

10. A device according to claim 1, characterized by the fact that it includes means (250) suitable for limiting pivoting of the shutter (200) relative to the housing (100).

11. A device according to claim 1, characterized by the fact that the pivot angle of the shutter (200) is about 45°.

12. A device according to claim 1, characterized by the fact that the front frame (110) of the housing (100) has a sloping plane (117) directed towards the pivot axis of the shutter (200).

13. A device according to claim 1, characterized by the fact that the shutter (200) comprises a cylindrical dome (210) and two mutually parallel side plates (220, 230).

14. A device according to claim 13, characterized by the fact that it is provided with a a peg (250) projecting from the outside surface of the cylindrical dome (210) and defining an end-of-stroke abutment for the shutter (200).

15. A device according to claim 1, characterized by the fact that a cylindrical dome (210) of the shutter (200) is provided with ribs (260) on its outside surface.

* * * * *